1

3,219,591
ORGANOALUMINUM OXIDE CATALYST
COMPOSITION
Edwin J. Vandenberg, Wilmington, Del., assignor to Hercules Powder Company, Wilmington, Del., a corporation of Delaware
No Drawing. Original application May 11, 1959, Ser. No. 812,079, now Patent No. 3,135,705, dated June 2, 1964. Divided and this application Jan. 16, 1964, Ser. No. 338,008
10 Claims. (Cl. 252—431)

This application is a division of U.S. application Serial No. 812,079, filed May 11, 1959, now U.S. Patent 3,135,-705, which application was a continuation-in-part of U.S. application Serial No. 738,626, filed May 29, 1958, and now abandoned.

This invention relates to a new process of polymerizing epoxides and more particularly to an improved process of polymerizing epoxides with an organoaluminum compound.

In accordance with this invention, it has been discovered that greatly improved results are obtained in the polymerization of epoxides when an organoaluminum compound that has been reacted and/or complexed with water within a given molar ratio is used as a catalyst for the polymerization. Just what the function of the water may be is not known, but the amount of water that is present in the polymerization mixture is critical and should be an amount within the range of from about 0.1 mole of water to 1 mole of the organoaluminum compound used as catalyst up to about 1.5 moles of water to 1 mole of the organoaluminum compound. By carrying out the polymerization in accordance with this invention, it has been found that the conversion and/or yield are greatly improved over the process when no water is used and in many cases a much higher molecular weight polymer is also obtained. Frequently, the crystallinity of the polymer is greatly improved and the amount of the crystalline polymer is a greater percentage of the total polymer. By the proper choice of the organoaluminum compound that is reacted with the water, one may favor the formation of either a crystalline or crystallizable polymer or an amorphous polymer in those cases where both forms of the polymer exist. Many other advantages will be apparent from the following description.

Any epoxide may be homopolymerized or copolymerized with a second epoxide by the process of this invention to obtain improved results. Exemplary of the epoxide that may be homopolymerized or copolymerized are the alkylene oxides such as ethylene oxide, propylene oxide, butene oxides, isobutylene epoxide, substituted alkylene oxides such as epicholorohydrin, epibromohydrin, methallyl chloride epoxide, trifluoromethyl ethylene oxide, perfluoropropylene oxide, perfluoroethylene oxide, vinyl chloride epoxide, dichloroisobutylene epoxide, 1,2-dichloro-3,4-epoxybutane, 1-chloro-3,4-epoxybutane, 1-chloro-4,5-epoxypentane, 1,1-dichloro-2,3-epoxypropane, 1,1,1-trichloro-2,3-epoxypropane, 1,1,1-trichloro-3,4-epoxybutane, etc., cycloaliphatic epoxides such as cyclohexene oxides, vinyl cyclohexene oxides (mono- and dioxides), α-pinene epoxide, dipentene epoxide, etc., epoxy ethers such as alkyl glycidyl ethers as, for example, methyl glycidyl ether, ethyl glycidyl ether, isopropyl glycidyl ether, isobutyl glycidyl ether, tert-butyl glycidyl ether, n-hexyl glycidyl ether, n-octyl glycidyl ether, etc., phenyl glycidyl ether, chlorophenyl glycidyl ethers, nitrophenyl glycidyl ethers, alkylphenyl glycidyl ethers, chloroalkyl glycidyl ethers, such as chloroethyl glycidyl ether, bromoethyl glycidyl ether, 2-chloro-1-methyl ethyl glycidyl ether, unsaturated glycidyl ethers such as vinylglycidyl ether, allyl glycidyl ether, etc., glycidyl esters such as glycidyl acetate, glycidyl propionate, glycidyl pivalate, glycidyl methacrylate, glycidyl acrylate, etc., alkyl glycidates such as methyl glycidate, ethyl glycidate, etc., and other epoxides as, for example, styrene oxide, α-methyl-styrene oxide, butadiene mono- and dioxides, epoxy stearates, 1-dimethylamino-2,3-epoxypropane, trimethyl 2,3-epoxypropyl ammonium chloride, etc. As pointed out above, any of these mono- and polyepoxides may be homopolymerized or any mixture of two or more may be copolymerized.

Any organoaluminum compound reacted with water may be used as the catalyst for the polymerization of epoxides in accordance with this invention. Exemplary of thea organoaluminum compounds that may be used are trialkylaluminum compounds, tricycloalkylaluminum compounds, triarylaluminum compounds, dialkylaluminum hydrides, monoaluminumalkyl dihydrides, dialkylaluminum halides, monoalkylaluminum dihalides, dialkylaluminum alkoxides, monoalkylaluminum dialkoxides, and complexes of these compounds as, for example, the alkali metal aluminum tetraalkyls such as lithiumaluminum tetraalkyl, etc. Thus, these compounds may be defined as any aluminum compounds containing an aluminum to carbon bond or having the formula $AlRX_2$ where R is any alkyl, cycloalkyl, aryl, or alkaryl radical and X may be alkyl, such as methyl, ethyl, propyl, isopropyl, n-butyl, isobutyl, amyl, hexyl, octyl, decyl, etc., aryl, such as phenyl, tolyl, halophenyl, etc., cycloalkyl such as cyclohexyl etc., hydrogen, halogen such as chlorine, fluorine, or bromine, alkoxy such as methoxy, ethoxy, isopropoxy, butoxy, isobutoxy, tert-butoxy, etc., and the radical

such as acetoxy, stearoxy, benzoxy, etc. Another group of these compounds are those formed by reacting an aluminum alkyl with a polyol such as ethylene glycol, propylene glycol, glycerin, pentaerythritol, sorbitol, catechol, resorcinol, etc., in which case the X in the above formula would be —O—R″—O—AlRX, where R″ is alkylene, phenylene, etc. In some cases it may be desirable to complex the organoaluminum compound with a complexing agent such as tetrahydrofuran as, for example, triisobutylaluminum complexed with a molar amount of tetrahydrofuran, etc.

Other types of organoaluminum compounds that may be reacted with water and used as the catalyst in accordance with this invention are the alkylaluminum chelates and alkylaluminum enolates such as those formed by reacting a trialkylaluminum or dialkylaluminum hydride such as triethylaluminum, triisobutylaluminum, diisobutylaluminum hydride, etc., with an organic compound that is capable of forming a ring by co-ordination with its unshared electrons and the aluminum atom. Preferably these chelating agents are characterized by two functional groups, one of which is an —OH group or —SH group, as for example, a hydroxyl, or an enol of a ketone, sulfoxide or sulfone, an OH of a carboxyl group, etc., which —OH or —SH group interacts with the trialkylaluminum or dialkylaluminum hydride to form a conventional, covalent aluminum-oxygen bond or aluminum-sulfur bond. The second functional group is one which contains an oxygen, nitrogen, or sulfur atom that forms a co-ordinate bond with the aluminum. Examples of groups containing such oxygen, nitrogen or sulfur atoms are:

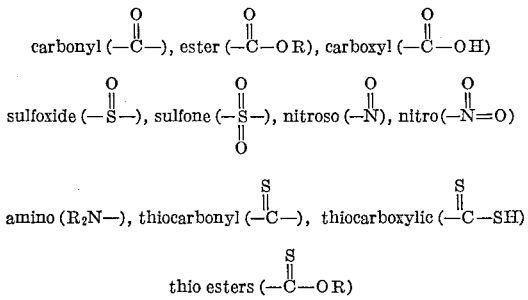

etc., groups. The ring size formed with the aluminum by the chelating agent preferably contains five or six atoms including the aluminum, but rings with four and seven atoms are also operable. The amount of chelating agent reacted with the alkylaluminum compound will generally be within the range of from about 0.01 to about 1.5 moles of chelating agent per mole of aluminum and preferably will be from about 0.1 to about 1 mole per mole of aluminum alkyl. Exemplary of the chelating agents that may be reacted with a trialkylaluminum or dialkylaluminum hydride and the chelate then reacted with water to produce the catalysts of this invention are diketones, such as acetylacetone, trifluoroacetylacetone, acetonylacetone, benzoylacetone, furoylacetone, thenoyltrifluoroacetone, dibenzoyl methane, 3-methyl - 2,4 - pentane-dione, 3-benzyl - 2,4 - pentane-dione, etc., ketoacids, such as acetoacetic acid, ketoesters such as ethyl acetoacetate, ketoaldehydes such as formylacetone, hydroxyketones such as hydroxyethyl methyl ketone, hydroxyacetone, o-hydroxyacetophenone, 2,5-dihydroxy-p-benzoquinone, etc., hydroxyaldehydes such as salicylaldehyde, hydroxy esters such as ethyl glycolate, 2-hydroxyethyl acetate, dicarboxylic acids and their esters such as oxalic acid, malonic acid, etc., monoesters of oxalic acid, mono- and diesters of malonic acid, etc., dialdehydes such as malonaldehyde, alkoxyacids such as ethoxyacetic acid, ketoximes such as 2,3 - butane-dione-monoxime, dialdehyde monooximes such as glyoxal monoxime, hydroxamic acids such as N-phenyl benzohydroxamic acid, dioximes such as dimethyl glyoxime, nitro compounds such as 1,3-nitroalcohols, 1,3-nitroketones, 2-nitroacetic acid, nitroso compounds such as 1,2-nitroso-oximes, etc. Chelating agents with two or more chelating functions may also be used, as for example, 2,5-dihydroxy-p-benzoquinone, bis(1,3-diketones) such as (CH$_3$CO)$_2$CHCH(COCH$_3$)$_2$ (CH$_3$CO)$_2$CH(CH$_2$)$_n$CH(COCH$_3$)$_2$ where $n$ is 2, 6, or 10, bis(1,2-ketoximes), bis(1,2-dioximes), etc.

Regardless of the organoaluminum compound that is used, it should be reacted with water as set forth above in a molar ratio of from about 0.1 mole of water per mole of organoaluminum compound up to about 1.5 moles of water per mole of aluminum compound. Slightly higher amounts of water may be used but at a ratio of about 2 moles of water to 1 mole of organoaluminum compound, there is little or no improvement over the use of no water in the polymerization system and when the ratio of water to organoaluminum compound gets appreciably above 2:1, it has an adverse effect and the polymerization is retarded or otherwise adversely affected. Preferably the molar ratio of water to organoaluminum compound will be in the range of from about 0.2:1 to about 1:1. The exact amount of water will depend to some extent on the organoaluminum compound, the epoxide being polymerized, the diluent, temperature, etc.

Any desired procedure may be used for reacting the organoaluminum compound with the specified molar ratio of water. Generally better results are obtained if the organoaluminum compound and water are prereacted and the reaction product then added to the polymerization mixture. This may readily be done, and preferably is done, by adding the specified amount of water gradually to a solution of the organoaluminum compound in an inert diluent as, for example, a hydrocarbon diluent such as n-hexane, toluene, or an ether such as diethyl ether or a mixture of such diluents. It may also be done in the absence of a diluent. If a chelating agent is used, it may be added before or after reacting with water. The chelating agent and prereacted organoaluminum-water product may also be reacted in situ. These organoaluminum-water reaction products may be used immediately or aged or, if desired, heat-treated in some cases. Excellent results may also be obtained by reacting the organoaluminum compound with the water within the specified molar ratio in situ. This may be accomplished by adding the specified amount of water to the epoxide or mixture of epoxides being polymerized and then adding the organoaluminum compound, or the two may be added to the polymerization reaction mixture simultaneously. If desired, the organoaluminum-water reaction product may be used in combination with other organoaluminum compounds.

The exact nature of this reaction product of the organoaluminum compound with the above-specified amount of water is not known. As pointed out, the amount of water reacted with the organoaluminum compound is critical to produce the superior catalyst for the polymerization of epoxides in accordance with this invention. It is believed that a reaction rather than a complex formation takes place. Thus when a trialkylaluminum compound is reacted with water, it has been found that a very rapid and complete reaction occurs to liberate 2 moles of alkane per mole of water. Thus, with triethylaluminum, 2 moles of ethane per mole of water are liberated. The products are believed to be organoaluminum oxide type of compounds, as, for example,

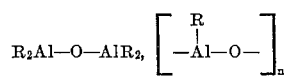

etc. These compounds are probably somewhat associated in organic media. The most active or preferred catalyst species is probably the polymeric species where there is about one R group per Al. Regardless of what the theory may be, the reaction product obtained when an organoaluminum compound is reacted with from about 0.1 mole to about 1.5 moles of water per mole of aluminum compound is an outstanding catalyst for the polymerization of epoxides.

Any amount of the organoaluminum-water reaction product may be used to catalyze the polymerization process in accordance with this invention from a minor catalytic amount up to a large excess but, in general, will be within the range of from about 0.2 to 10 mole percent based on the monomer being polymerized and preferably will be within the range of from about 1 to about 5 mole percent based on the monomer being polymerized. The amount used depends in part on such factors as monomer purity, diluent purity, etc., less pure epoxides and diluents requiring more catalyst to destroy reactive impurities. In order to decrease catalyst consumption, it is generally preferred that impurities such as carbon dioxide, oxygen, aldehydes, alcohols, etc., be kept as low a level as practical.

The polymerization reaction may be carried out by any desired means, either as a batch or continuous process with the catalyst added all at one time or in increments during the polymerization or continuously throughout the polymerization. If desired, the monomer may be added gradually to the polymerization system. It may be carried out as a bulk polymerization process, in some cases at the boiling point of the monomer (reduced to a convenient level by adjusting the pressure) so as to remove the heat of reaction. However, for ease of operation, it is more generally carried out in the presence of an inert diluent. Any diluent that is inert under the polymerization reaction conditions may be used as, for example, ethers such as the dialkyl, aryl or cycloalkyl ethers as, for example, diethyl ether, dipropyl ether, diisopropyl ether, aromatic hydrocarbons such as benzene, toluene, etc., or saturated aliphatic hydrocarbons and cycloaliphatic hydrocarbons such as n-heptane, cyclohexane, etc., and halogenated hydrocarbons as, for example, chlorobenzene or haloalkanes such as methyl chloride, methylene chloride, chloroform, carbon tetrachloride, ethylene dichloride, etc. Obviously, any mixture of such diluents may be used and in many cases is preferable. For example, when saturated aliphatic hydrocarbons are used as the diluent, it is preferable, particularly if high molecular weight polymers are desired or if very little diluent is present, to use them in admixture with ethers. A complexing agent for the organoaluminum compound, such as ether, tetrahydrofuran, etc., may be used and is particularly desirable in a bulk polymerization process.

The polymerization process in accordance with this invention may be carried out over a wide temperature range and pressure. Usually, it will be carried out at a temperature from about −80° C. up to about 250° C., preferably from about −80° C. to about 150° C. and more preferably within the range of about −30° C. to about 100° C. Usually, the polymerization process will be carried out at autogenous pressure, but superatmospheric pressures up to several hundred pounds may be used if desired and in the same way, subatmospheric pressures may also be used.

The following examples exemplify the improved results that may be obtained on polymerizing epoxides in accordance with this invention. All parts and percentages are by weight unless otherwise indicated. As will be seen from these examples, the process of this invention makes it possible to not only obtain greatly improved yields of polymer but makes it possible to select the proper conditions to prepare a polymer of any desired molecular weight. The molecular weight of the polymers produced in these examples is shown by the Reduced Specific Viscosity (RSV) given for each. By the term "Reduced Specific Viscosity" is meant the $\eta_{sp}/C$ determined on a solution of the polymer in a given diluent. In the case of the poly(epichlorohydrins) the RSV is determined on a 0.1% solution of the polymer in cyclohexanone containing 0.5% of the antioxidant 2,2′-methylene-bis(4-methyl-6-tert-butyl phenol) which solution is prepared by heating the polymer and cyclohexanone to 125° C. to total solution and then cooling to 50° C. at which temperature the determination is made, or the RSV for the poly(epichlorohydrins) is determined on a 0.1% solution of the polymer in α-chloronaphthalene dissolved at 100° C. and the viscosity determined at that temperature. The latter method is more accurate. For convenience in comparing the data in the following examples, all of the RSV's obtained on the poly(epichlorohydrins) in cyclohexanone (CH) have been converted to the value it would be in α-chloronaphthalene (CN) using the following equation to relate them:

$$\log (RSV_{CN}) = 1.170 \log (RSV_{CH}) - 0.133$$

In the case of the other polymers, the diluent and concentration at which the RSV is determined are stipulated.

EXAMPLES 1 TO 8

These examples demonstrate the polymerization of epichlorohydrin with an organoaluminum compound reacted with water in comparison with an organoaluminum compound in the absence of water. In each, two polymerization vessels free of air were charged under nitrogen with the diluent, diethyl ether and/or n-heptane, and 10 parts of epichlorohydrin. After equilibrating at 30° C. (65° C. in Example 7), a solution of the catalyst was injected. The catalyst solution was prepared by diluting a 1 or 2 molar solution of an alkylaluminum compound in n-heptane to 0.5 molar with ether. Water in an amount equal to a specified molar ratio of water to alkylaluminum compound was then added and the solution agitated at 30° C. for 16 to 20 hours. In the control, no water was added to the catalyst solution. In Example 8 the triisobutylaluminum was complexed with a molar amount of tetrahydrofuran and then tested with and without water as above. After agitating the reaction mixture for 19 hours at 30° C. (65° C. in Example 7), the polymerization was stopped by adding 4 parts of anhydrous ethanol. The mixture was then diluted with about 40 parts of diethyl ether, after which the ether-insoluble polymer was collected and washed twice with ether. It was then purified by slurrying the insoluble polymer with a 1% solution of hydrogen chloride in ethanol. It was again collected, washed with methanol until neutral, then with a 0.4% solution of Santonox, i.e., 4,4′-thiobis(6-tert-butyl-m-cresol), in methanol and finally was dried for 16 hours at 50° C. under vacuum.

In Table I are set forth the total amount of diluent (mixture of n-heptane and diethyl ether) and the percent of ether present in the diluent, the alkylaluminum catalyst and the amount thereof used (i.e., the amount that was reacted with the specified amount of water), the total conversion to polymer, the percent conversion to ether-insoluble polymer and the RSV of the latter and percent of ether-insoluble polymer present in the total polymer.

*Table I*

| Ex. No. | Diluent | | Catalyst | Parts | Total percent Conv. | Ester-Insoluble Polymer | | |
|---|---|---|---|---|---|---|---|---|
| | Total Parts | Percent Ether | | | | Percent Conv. | RSV | Percent of Total |
| 1a | 35 | 94 | $(C_2H_5)_3Al$ | 0.46 | 12 | 8.0 | 3.9 | 67 |
| 1b | 35 | 94 | $(C_2H_5)_3Al \cdot 0.7H_2O$ | 0.46 | 89 | 85.0 | 3.3 | 96 |
| 2a | 17.6 | 91 | $(CH_3)_3Al$ | 0.29 | 11 | 0.6 | 2.4 | 6 |
| 2b | 17.6 | 96 | $(CH_3)_3Al \cdot 0.5H_2O$ | 0.29 | 47 | 37.7 | 3.5 | 80 |
| 3a | 17.6 | 88 | $(i-C_4H_9)_2AlH$ | 0.57 | 33 | 0.9 | 3.5 | 2.7 |
| 3b | 17.6 | 88 | $(i-C_4H_9)_2AlH \cdot 0.5H_2O$ | 0.57 | 83 | 77.9 | 3.1 | 94 |
| 4a | 17.6 | 92 | $C_2H_5AlCl_2$ | 0.51 | 22 | 0.1 | | 0.5 |
| 4b | 17.6 | 84 | $C_2H_5AlCl_2 \cdot 0.5H_2O$ | 0.51 | 17 | 1.0 | >1.4 | 5.9 |
| 5a | 17.6 | 88 | $(C_2H_5)_2AlCl$ | 0.48 | 22 | 0.2 | | 0.9 |
| 5b | 17.6 | 84 | $(C_2H_5)_2AlCl \cdot 0.5H_2O$ | 0.48 | 31 | 10.5 | 2.2 | 34 |
| 6a | 17.6 | 89 | $(C_2H_5)_2AlO(n-C_4H_9)$ | 0.63 | 3 | 0.9 | >2.3 | 30 |
| 6b | 17.6 | 89 | $(C_2H_5)_2AlO(n-C_4H_9) \cdot 0.5H_2O$ | 0.63 | 6 | 2.9 | 2.7 | 48 |
| 7a | 17.6 | 90 | $(C_2H_5)_2AlO(i-C_3H_7)$ | 0.58 | 3 | 2 | 1.9 | 67 |
| 7b | 17.6 | 90 | $(C_2H_5)_2AlO(i-C_3H_7) \cdot 0.5H_2O$ | 0.58 | 30 | 22 | 2.3 | 73 |
| 8a | 17.6 | 84 | $(i-C_4H_9)_3Al \cdot THF^*$ | 1.08 | 19 | 6.3 | 4.9 | 33 |
| 8b | 17.6 | 84 | $(i-C_4H_9)_3Al \cdot THF^* \cdot 0.7H_2O$ | 1.08 | 87 | 77 | 3.6 | 89 |

*THF=tetrahydrofuran.

The ether-insoluble polymer produced in Example 8 was extracted with acetone at room temperature for about 16 hours. The cold acetone-insoluble polymer was isolated, washed with acetone and then with acetone containing 0.05% Santonox in acetone and dried. This poly(epichlorohydrin) was highly crystalline by X-ray and had an RSV of 3.9. Films of this polymer were prepared by compression molding the polymer flake at 280° F. (500 p.s.i.) between chrome-plated brass plates. After cooling to room temperature, the films were allowed to crystallize for 0.2–0.5 hours before removing from the press. The films were oriented by cold-drawing 200% at room temperature and set at 70° C. in air. The physical properties of these films before and after orientation are tabulated below.

|  | Unoriented | Oriented |
|---|---|---|
| Tensile strength, p.s.i. | 2,800 | 14,000 |
| Ultimate elongation, percent | 210 | 37 |
| Tensile modulus, p.s.i. | 46,000 | 70,000 |

Strain rate of 500% per minute.

The tear resistance of these films is outstanding, and they have excellent stability to heat and good solvent resistance. For most purposes, a light absorber and antioxidant are preferably added to obtain maximum light stability.

EXAMPLES 9 TO 13

Epichlorohydrin was polymerized using the general procedure described for Examples 1 to 8. In Examples 9 and 10, the molar ratios of water to triethylaluminum or triisobutylaluminum respectively were varied. The catalyst in Examples 10 and 13 was added in four equal portions 0.5 hour apart. In Example 13 the ratio of catalyst to epichlorohydrin was varied. In Examples 11 and 12, the molar ratio of water to aluminum compound was varied but in these cases the water and aluminum compound were reacted in situ by adding the specified amount of water to the epichlorohydrin before injecting the solution of alkylaluminum compound. In each case the polymerization was run for 19 hours at 30° C. The data for each example are set forth in Table II. The amount of catalyst shown in the table is parts of alkylaluminum compound prior to reaction with water.

EXAMPLE 14

Amorphous or largely amorphous poly(epichlorohydrin)s prepared, as for example, described in the foregoing examples, and having an RSV of 0.5 and above, i.e. a weight average molecular weight of about 130,000 and above, are elastomeric and are outstanding in that they may be vulcanized to produce highly solvent-resistant vulcanized rubbers. Thus, Example 10b was repeated except that the catalyst solution was added all at one time instead of in four portions at intervals. A total conversion of 100% was obtained, 77% of which was an ether-insoluble polymer. This ether-insoluble polymer contained 13% crystalline polymer, the remainder being amorphous. The polymer after cold milling had an RSV of 0.75.

It was cross-linked by mixing together on a two-roll mill (rolls cooled to about 50° F.) 100 parts of the polymer, 12.5 parts of carbon black, 12.5 parts of neutral silica and 3 parts of hexamethylenediamine carbamate and then heating at 300° F. for 40 minutes. The vulcanizate so obtained had a tensile strength of 1655 p.s.i., a 100, 200, 300 and 400% modulus of 395, 555, 930 and 1510 p.s.i., respectively, an ultimate elongation of 420%, break set of 10%, Shore hardness (A) of 63, and tear strength of 121 lb./in. This vulcanizate of poly(epichlorohydrin) was found to be very stable to outdoor exposure, being unchanged after 3 months' exposure. It was also very stable to accelerated aging tests, with no failure in either the Fade-Ometer or Weather-Ometer at 2500 hours exposure.

EXAMPLES 15 TO 26

These examples demonstrate the polymerization of epichlorohydrin with various diluents and organoaluminum compounds. The general procedure described for Examples 1 to 8 was used, the polymerization being run for 19 hours at 30° C., except for Examples 24 to 26 which were run at 65° C. The catalyst used in Example 17 was formed in situ as described above for Examples 11 and 12. In Example 21, the catalyst solution was added in two portions one hour apart and in Example 22 in four equal portions 30 minutes apart. In Example 24, the alkylaluminum compound used was diethylaluminum acetylacetonate formed by reacting triethylaluminum in 60:40 n-heptane:diethyl ether with acetylacetone in an amount equal to one mole per mole of triethylaluminum and agi-

*Table II*

| Ex. No. | Diluent | | Catalyst | Parts | Total Percent Conv. | Ether-Insoluble Polymer | | |
|---|---|---|---|---|---|---|---|---|
| | Total Parts | Percent Ether | | | | Percent Conv. | RSV | Percent of Total |
| 9a | 35 | 94 | (C$_2$H$_5$)$_3$Al | 0.46 | 12 | 8.0 | 3.9 | 67 |
| 9b | 35 | 94 | (C$_2$H$_5$)$_3$Al·0.1H$_2$O | 0.46 | 37 | 32.6 | 3.6 | 88 |
| 9c | 35 | 94 | (C$_2$H$_5$)$_3$Al·0.3H$_2$O | 0.46 | 62 | 56.7 | 3.0 | 91 |
| 9d | 35 | 94 | (C$_2$H$_5$)$_3$Al·0.5H$_2$O | 0.46 | 82 | 77.7 | 3.2 | 95 |
| 9e | 35 | 94 | (C$_2$H$_5$)$_3$Al·0.7H$_2$O | 0.46 | 89 | 85.0 | 3.3 | 96 |
| 9f | 35 | 94 | (C$_2$H$_5$)$_3$Al·1.0H$_2$O | 0.46 | 37 | 37.0 | 1.9 | 99 |
| 10a | 17.6 | 84 | (i-C$_4$H$_9$)$_3$Al·0.3H$_2$O | 0.79 | 89 | 87 | 2.3 | 98 |
| 10b | 17.6 | 84 | (i-C$_4$H$_9$)$_3$Al·0.5H$_2$O | 0.79 | 91 | 90 | 1.7 | 99 |
| 10c | 17.6 | 84 | (i-C$_4$H$_9$)$_3$Al·0.7H$_2$O | 0.79 | 93 | 91 | 1.7 | 98 |
| 10d | 17.6 | 84 | (i-C$_4$H$_9$)$_3$Al·0.9H$_2$O | 0.79 | 92 | 89 | 2.5 | 97 |
| 11a | 35 | 97 | (C$_2$H$_5$)$_3$Al | 0.23 | 10 | 7.5 | 4.1 | 75 |
| 11b | 35 | 97 | (C$_2$H$_5$)$_3$Al / H$_2$O | 0.23 / 0.04 | 55 | 53 | 1.8 | 96 |
| 11c | 35 | 97 | (C$_2$H$_5$)$_3$Al / H$_2$O | 0.23 / 0.07 | 10 | 8.5 | 1.8 | 85 |
| 11d | 35 | 97 | (C$_2$H$_5$)$_3$Al / H$_2$O | 0.23 / 0.14 | 2 | None | | 0 |
| 12a | 17.6 | 83 | (i-C$_4$H$_9$)$_3$Al | 0.79 | 40 | 5.2 | 3.0 | 13 |
| 12b | 17.6 | 83 | (i-C$_4$H$_9$)$_3$Al / H$_2$O | 0.79 / 0.02 | 64 | 39 | 2.9 | 61 |
| 12c | 17.6 | 83 | (i-C$_4$H$_9$)$_3$Al / H$_2$O | 0.79 / 0.04 | 76 | 58 | 2.5 | 77 |
| 12d | 17.6 | 83 | (i-C$_4$H$_9$)$_3$Al / H$_2$O | 0.79 / 0.07 | 80 | 63 | 2.2 | 79 |
| 12e | 17.6 | 83 | (i-C$_4$H$_9$)$_3$Al / H$_2$O | 0.79 / 0.14 | 23 | 16 | 2.3 | 70 |
| 12f | 17.6 | 83 | (i-C$_4$H$_9$)$_3$Al / H$_2$O | 0.79 / 0.29 | 0 | | | |
| 13a | 23 | 88 | (i-C$_4$H$_9$)$_3$Al·0.5H$_2$O | 0.79 | 93 | 89 | 1.1 | 96 |
| 13b | 23 | 88 | (i-C$_4$H$_9$)$_3$Al·0.5H$_2$O | 0.53 | 90 | 87 | 1.5 | 97 |
| 13c | 23 | 88 | (i-C$_4$H$_9$)$_3$Al·0.5H$_2$O | 0.26 | 60 | 57 | 1.9 | 95 | tating for 20 hours at 30° C. In Examples 25 and 26 the alkylaluminum compound used was triisobutylaluminum chelated with 0.5 mole of diethyl malonate and 0.5 mole of N-phenylbenzohydroxamic acid, respectively and agitated at 30° C. for 20 hours. The data for each example are tabulated in Table III. The amount of catalyst added in each case is indicated as the parts of the trialkylaluminum that was reacted with water in the indicated mole ratio.

The ether-insoluble polymer produced in Example 21 was recrystallized by dissolving in acetone at 65° C. and then allowing it to crystallize at 20–30° C. for about 16 hours after which it was collected, washed with acetone containing 0.5% Santonox and dried. The poly(epichlorohydrin) so obtained had an RSV of 2.3 and was shown to be highly crystalline by X-ray. Films of this polymer were prepared as described in Example 8. This film had a tensile strength of 2720 p.s.i., ultimate elongation of 60%, tensile modulus of 86,000 p.s.i. and a tensile impact of 1.20.

In Example 33, the ether-soluble fraction was also soluble in methanol and was precipitated from the methanol by the addition of 20% water. It was a very tacky rubber with an RSV of 0.86 measured as 0.1% solution in cyclohexanone at 50° C. That polymerization had taken place through the oxide linkage and not the ethylene double bond was shown by near infrared, the polymer containing 33.2% allyl (theory 36.0%). This poly(allyl glycidyl ether) was vulcanized by milling 100 parts of the polymer with 50 parts of carbon black, 2 parts of sulfur, and 1.5 parts of mercaptobenzothiazole for 10 minutes and then press curing at 300° F. for 45 minutes. The vulcanizate so obtained was pliant and rubbery. It had a tensile strength of 500 p.s.i., a modulus (100%) of 400 p.s.i., an ultimate elongation of 120%, a Shore hardness (A) of 50 and a break set of 5%.

The ether-insoluble poly(epibromohydrin) of Example 34 was fractionated by agitating 6.5 parts of it with 200 parts of acetone overnight at room temperature. The acetone-insoluble polymer was separated by filtration, Table III

| Ex. No. | Diluent | | Catalyst | Parts | Total Percent Conv. | Ether-Insoluble Polymer | | |
|---|---|---|---|---|---|---|---|---|
| | Total Parts | Components | | | | Percent Conv. | RSV | Percent of Total |
| 15 | 19 | 99.1% n-heptane, 0.9% ether | (C₂H₅)₂Al·0.6H₂O | 0.46 | 76 | 32 | 0.07 | 43 |
| 16 | 19 | 85% n-heptane, 15% ether | (C₂H₅)₃Al·0.6H₂O | 0.46 | 84 | 71 | 1.3 | 84 |
| 17 | 17.6 | 100% n-heptane | (i-C₄H₉)₃Al / H₂O | 0.79 / 0.07 | 60 | 52 | 0.14 | 87 |
| 18 | 17.6 | 11% n-heptane, 89% diisopropyl ether | (C₂H₅)₃Al·0.5H₂O | 0.46 | 78 | 69 | 2.2 | 88 |
| 19 | 25 | 83% CH₂Cl₂, 8.5% n-heptane, 8.5% ether | (i-C₄H₉)₃Al·0.5H₂O | 0.79 | 91 | 90 | 2.4 | 99 |
| 20 | 19 | 79% C₆H₅Cl, 10.5% n-heptane, 10.5% ether | (i-C₄H₉)₃Al·0.5H₂O | 0.79 | 86 | 78 | 0.8 | 91 |
| 21 | 2.3 | 36% n-heptane, 64% ether | (C₂H₅)₃Al·0.5H₂O | 0.19 | 63 | 55 | 2.0 | 87 |
| 22 | 17.6 | 5% n-heptane, 95% ether | (n-C₈H₁₇)₃Al·0.7H₂O | 1.54 | 88 | 88 | 2.9 | 100 |
| 23 | 35 | 27% n-heptane, 73% ether | (C₆H₅)₃Al·0.5H₂O | 1.03 | 24 | 10 | 2.2 | 42 |
| 24 | 17.6 | 12% n-heptane, 88% ether | (C₂H₅)₂AlAcetylacetonate·0.5H₂O | 0.74 | 78 | 76 | 7.7 | 98 |
| 25 | 26 | 90% n-heptane, 10% ether | (i-C₄H₉)₃Al·0.5 diethyl malonate·0.5H₂O | 0.79 | 40 | 36 | 1.4 | 90 |
| 26 | 26 | 90% n-heptane, 10% ether | (i-C₄H₉)₃Al·0.5 N-phenylbenzohydroxamic acid·0.5H₂O | 0.79 | 41 | 35 | 3.1 | 85 |

EXAMPLES 27 TO 35

In each of these examples 10 parts of the specified epoxide were polymerized by the general procedure described for Examples 1 to 8 using as the catalyst the reaction product of 0.46 part of triethylaluminum and with 0.04 part of water (molar ratio of 1:0.6), except in the case of Examples 34 and 35 where 0.79 part of triisobutylaluminum was reacted with 0.04 part of water (molar ratio of 1:0.5) was used, the total amount of n-heptane-ether diluent being 17.6 parts of which 88–90% was ether. Each of the polymerizations was carried out for 19 hours at 30° C., except for Example 35 which was run 43 hours. The monomer used and the results obtained in each case are tabulated in Table IV.

In Examples 27–30 the ether-insoluble polymer was separated and purified as described in those examples and in each case was shown to be crystalline by its X-ray diffraction pattern. In Examples 31 and 35 where only an ether-soluble polymer was formed, the polymer was isolated from the ether by concentrating the solution and precipitation with about 10 volumes of methanol containing 0.2% Santonox. The polymer so obtained was washed with methanol and dried. The ether-insoluble and ether-soluble polymers in Examples 32 and 33 were recovered in the same way, but the ether-insoluble polymer was washed with ether and then with ether containing 0.2% Santonox and dried.

washed with acetone and then suspended in sufficient acetone ot make a 1% suspension, and heated to 80–82° C. in a closed vessel under nitrogen whereby it was dissolved in 4 hours. It was then cooled to 30° C. and allowed to crystallize overnight. The recrystallized acetone-insoluble polymer was again washed with acetone, then with methanol containing 0.2% Santonox and finally was dried for 16 hours at 80° C. There was obtained 1.3 parts of a white, film-like, somewhat rubbery solid. It had an RSV of 1.8 and was shown to be moderately crystalline by X-ray. Analysis for bromine showed agreement with the theoretical value. The acetone-soluble polymer was recovered by combining the acetone extracts and washes, removing the acetone and then treating the residue with 80 parts of methanol containing 0.2% Santonox after which the polymer was dried for 16 hours at 80° C. under vacuum. There was recovered 2.8 parts of the acetone-soluble polymer which was a tough, rubbery material having an RSV of 0.8 and shown to be amorphous by X-ray. Its bromine analysis agreed with the theoretical.

This amorphous poly(epibromohydrin) was crosslinked by milling 100 parts of the polymer with 4 parts of hexamethylenediamine carbamate and then heating for 40 minutes at 300° C. The vulcanizate was quantitatively insoluble in cyclohexanone after 4 hours at 60° C. and had the properties typical of a cross-linked elastomer.

Table IV

| Ex. No. | Monomer | Total percent Conv. | Ether-Insoluble Polymer | | | | Ether-Soluble Polymer | |
|---|---|---|---|---|---|---|---|---|
| | | | Percent Conv. | RSV | M. Pt., 0° C. | Remarks | Percent Conv. | Description |
| 27 | o-Chlorophenyl glycidyl ether | 81 | 1.0 | [1] 0.28 | 162 | Crystalline | 80 | Waxy. |
| 28 | p-Chlorophenyl glycidyl ether | 98 | 3.7 | [1] 0.56 | 165 | do | 84 | Viscous gel. |
| 29 | Butadiene monoxide | 24 | 1.7 | [2] 1.4 | 74 | Highly crystalline | 19 | Soft, waxy solid. |
| 30 | Styrene oxide | 60 | 0.9 | [1] 0.75 | 149 | do | 25 | Grease. |
| 31 | Hexyl glycidyl ether | 16 | None | | | | 1.6 | Tacky rubber, RSV 0.69.[2] |
| 32 | 2-chloroethyl glycidyl ether | 29 | 5.3 | [3] 0.52 | | Tacky rubbery film | 2.1 | Very viscous liquid, RSV 0.20.[3] |
| 33 | Allyl glycidyl ether | 74 | 0.06 | | | | 47 | Very tacky rubber, RSV 0.86.[3] |
| 34 | Epibromohydrin | 53 | 33 | [3] 1.2 | | Rubbery | | |
| 35 | Methallyl chloride epoxide | 29 | | | | | [4] 0.24 | White powder, highly crystalline, M. Pt. 105° C. |

[1] 0.1% in α-chloronaphthalene at 135° C.
[2] 0.1% in chloroform at 25° C.
[3] 0.1% in cyclohexanone at 50° C.
[4] Ether-soluble, methanol-insoluble fraction.

EXAMPLE 36

Phenyl glycidyl ether was polymerized using the process described for Examples 27–30, the polymerization being carried out for 19 hours at 30° C. A total conversion of 93% was obtained. The ether-insoluble polymer was highly crystalline and amounted to 84% and had an RSV of 1.7 (0.1% solution in α-chloronaphthalene at 135° C.). The ether-soluble polymer amounted to 9% and was soft and waxy.

The ether-insoluble poly(phenyl glycidyl ether) was extracted with benzene at room temperature and found to be 94% insoluble therein. Films of this benzene-insoluble polymer were prepared by compression molding the polymer flake between chrome-plated steel platens for 5 minutes at 350° F. and 400 p.s.i., cooling to room temperature and removing the films.

The benzene-insoluble polymer that remained from the above extraction was recrystallized by dissolving it in boiling xylene and then cooling to 30° C. About 70% of it was thereby recrystallized from xylene. This cold xylene-insoluble fraction was highly crystalline by X-ray and had an RSV of 1.8 and a melting point of 201° C. The cold xylene-soluble fraction was rubbery. Films of the xylene recrystallized poly(phenyl glycidyl ether), i.e., the cold xylene-insoluble polymer, were prepared in the same manner as those of the benzene-insoluble fraction. The physical data on each are tabulated below before and after orientation (drawn at 60° C. in a water bath to the indicated percent).

| Property | Benzene-Insoluble Polymer | | Xylene-Recrystallized Polymer | |
|---|---|---|---|---|
| | Unoriented | Oriented 600% | Unoriented | Oriented 400% |
| RSV | 1.5 | | 1.8 | |
| M Pt., ° C. | 201 | | 201 | |
| Tensile Strength, p.s.i. | 2,500 | 8,000 | 2,900 | 7,000 |
| Ultimate Elongation, Percent | 210 | 57 | 90 | 40 |
| Tensile Modulus, p.s.i. | 61,000 | 100,000 | 66,000 | 98,000 |
| Density | 1.18 | | | |

EXAMPLE 37

Example 36 was repeated except that in this case 9 parts of phenyl glycidyl ether were copolymerized with 1 part of epichlorohydrin and the polymerization reaction was short-stopped after 1 hour at 30° C. by adding 4 parts of anhydrous ethanol. The ether-insoluble polymer was isolated as in the foregoing examples and amounted to 24% conversion. It was a white solid resembling crystalline poly(phenyl glycidyl ether) in appearance and had an RSV of 2.8 (0.1% solution in α-chloronaphthalene at 135° C.) and a melting point of 176° C. Analysis for chlorine showed that the copolymer contained 4% epichlorohydrin.

Films of this phenyl glycidyl ether-epichlorohydrin were prepared by compression molding as described in Example 36. The film so obtained had a tensile strength of 1700 p.s.i., ultimate elongation of 320%, and a tensile modulus of 30,000 p.s.i. The film was clear, more flexible than that of poly(phenyl glycidyl ether) being flexible down to at least −20° C., and was capable of being oriented by cold-drawing. After orientation by cold-drawing 300% at room temperature, the film had a tensile strength of 11,000 p.s.i., ultimate elongation of 76, and a tensile modulus of 30,000 p.s.i. Exposure of the film in a Fade-Ometer showed it to have good light stability.

EXAMPLE 38

To a polymerization vessel with a nitrogen atmosphere was charged 9.8 parts of epichlorohydrin and 0.2 parts of allyl glycidyl ether. These epoxides were copolymerized using the general procedure described for Examples 1–8, the total n-heptane-ether diluent amounting to 35 parts and containing 88% ether. The catalyst used was 0.79 part of triisobutylaluminum which had been prereacted with 0.04 part of water, the latter being added stepwise to the alkylaluminum (0.5 mole of water per mole of aluminum), this catalyst being added to the polymerization reaction mixture in eight portions 15 minutes apart. After 2 hours at 30° C., the total conversion to polymer was 31%. The ether-insoluble copolymer was separated as described in those examples and amounted to a 15% conversion. It was rubbery, had an RSV of 3.5 (0.1% solution in cyclohexanone at 50° C.), and by near infrared based on alkyl group analysis was shown to contain 6.7% of the allyl glycidyl ether monomer. The ether-soluble copolymer was recovered from the ether filtrates and washes by concentration of the ether solution and precipitation with methanol. After drying it was a viscous liquid and amounted to 11% conversion. The rubbery, ether-insoluble epichlorohydrin-allyl glycidyl ether copolymer was cross-linked by mixing on a two-roll mill 100 parts of the polymer with 12.5 parts of carbon black, 12.5 parts of neutral silica, 2 parts of sulfur, 5 parts of zinc oxide, 2 parts of stearic acid, and 2.5 parts of tetramethyl thiuram disulfide and then curing by heating at 310° F. for 40 minutes. The vulcanizate so obtained had a tensile strength of 2475 p.s.i., a 100, 200, 300 and 400% modulus of 315, 580, 935 and 1335 p.s.i., respectively, an ultimate elongation of 640%, break set of 15%, Shore hardness (A) of 61 and a tear strength of 205 lb./in.

EXAMPLE 39

Ten parts of cyclohexene oxide and 12 parts of diethyl ether were charged into an air-free vessel, cooled to −78° C. and then 1 part of triisobutylaluminum which had been reacted with 0.1 mole of water per mole of aluminum in 5.6 parts of 50:50 ether:n-heptane was added. After 19 hours at −78° C., 4 parts of anhydrous ethanol and 35 parts of ether were added. The ether-insoluble poly(cyclohexene oxide) was collected, washed once with ether, once with a 1% solution of hydrogen chloride in ethanol and then with ethanol until neutral. It was finally washed with methanol containing 0.05% Santonox and was dried. This gave a 33% conversion of a tough, white, hard solid having an RSV of 1.00 (0.1% solution in chloroform at 25° C.). It was amorphous by X-ray. A portion of this polymer was compression molded for 3 minutes at 160° C. and 200 p.s.i. to give a very clear, glossy, hard film having a tensile strength of 4200 p.s.i., an ultimate elongation of 1.4% and a tensile modulus of 450,000 p.s.i.

The ether-soluble poly(cyclohexene oxide) was obtained from the ether filtrates. The ether solution was washed twice with 3% aqueous hydrochloric acid, then with water until neutral, then with a 2% aqueous sodium bicarbonate solution, and finally was washed 3 times with water. It was then concentrated and the polymer was precipitated by adding an excess of methanol containing 0.05% Santonox. This ether-soluble, methanol-insoluble polymer was collected and dried to give a 10% conversion of a soft, white powder which was amorphous by X-ray and had an RSV of 0.28 (0.1% solution in benzene at 25° C.).

EXAMPLE 40

Example 39 was repeated except that 10 parts of vinyl cyclohexene oxide was substituted for the cyclohexene oxide used in that example, and the polymerization was carried out at 30° C. for 19 hours. Only a trace of ether-insoluble polymer was obtained. The ether-soluble, methanol-insoluble polymer was isolated as described above and represented 84% conversion. This poly(vinyl cyclohexene oxide) had an RSV of 0.04 (0.1% solution in benzene at 25° C.) and was amorphous by X-ray. It was a hard, somewhat brittle solid.

EXAMPLE 41

A mixture of 1.7 parts of ethyl glycidate and 3.1 parts of ether under a nitrogen atmosphere was cooled to −78° C. and 0.08 part of triethylaluminum which had been pre-reacted with 0.6 mole of water per mole of aluminum in 0.8 part of diluent (58% ether and 32% n-heptane) was added. The polymerization reaction mixture was held at −78° C. for 17 hours, then at −40° C. for 22 hours, then at −18° C. for 33 hours and finally at 5° C. for 44 hours after which 0.7 part of anhydrous ethanol was added. The polymer was precipitated by adding 40 parts of methanol and 1.6 parts of a 10% solution of hydrogen chloride in methanol. The methanol-insoluble polymer was collected, washed neutral with methanol and then with methanol containing 0.7% Santonox and dried. The poly (ethyl glycidate) so obtained was a tough, somewhat rubbery, film-like solid. It was largely insoluble in boiling benzene, but dissolved in boiling cyclohexanone and, after filtering and concentrating until viscous, it was recovered by heptane precipitation. The purified polymer was collected, washed twice with ether and dried. It was a tough, white, somewhat rubbery solid which was of moderate crystallinity by X-ray. Its infrared spectrum was in accord with the assigned structure of poly(ethyl glycidate).

EXAMPLE 42

To a polymerization vessel with a nitrogen atmosphere atmosphere was charged 37.6 parts of diethyl ether, 15.3 parts of epichlorohydrin and 4.8 parts of propylene oxide. After equilibrating at 30° C., a catalyst solution was added in 4 equal portions at 30-minute intervals, said catalyst solution consisting of 1.58 parts of triisobutyl-aluminum complexed with 0.5 mole of water per mole of aluminum in a 50:50 mixture of n-heptane and diethyl ether. After 20 hours at 30° C. the total conversion to polymer was 16%. The polymerization was stopped by adding 4 parts of anhydrous ethanol after which 35 parts of diethyl ether was added to the reaction mixture. It was then washed twice with a 3% aqueous solution of hydrogen chloride, then with water until neutral and then with a 2% aqueous solution of sodium bicarbonate. After again washing with water, the ether-insoluble polymer was separated by centrifugation. This ether-insoluble polymer was washed with ether and then with ether containing 0.2% Santonox after which it was dried for 16 hours under vacuum. It was a white powder and crystalline by X-ray.

The ether-soluble polymer was recovered by combining the ether filtrate and washes, removing the ether until a viscous solution was obtained and then precipitating the polymer by adding about 10 volumes of methanol containing 0.2% Santonox. The methanol-insoluble polymer was then washed twice with the methanol Santonox solution and dried. This methanol-insoluble polymer amounted to a conversion of 2.7%, had an RSV of 1.0 and was a tacky rubber which was shown to be amorphous by X-ray. A chlorine analysis of this polymer showed that it contained 56% of the epichlorohydrin monomer.

EXAMPLE 43

To a polymerization vessel with a nitrogen atmosphere was charged 13.6 parts of diethyl ether, 6.7 parts of ethylene oxide and 3.3 parts of 1,1-diethylamino-2,3-epoxy propane. After equilibrating at 30° C. there was then injected 5.6 parts of a catalyst solution comprising a 50:50 mixture of diethyl ether and n-heptane and containing 0.79 part of triisobutylaluminum reacted with 0.5 mole of water per mole of aluminum, the catalyst solution being added in four portions at 30-minute intervals. After 19 hours at 30° C. the polymerization was stopped and the mixture was diluted with 35 parts of diethyl ether. The polymer was then isolated by centrifugation, washed once with ether and then with ether containing 0.2% Santonox. The polymer so obtained when dried was a dark brown, taffy-like solid. It was then extracted with hot toluene and the toluene-insoluble polymer was extracted twice with water. The water-soluble fraction was recovered by evaporating the water and drying. This water-soluble fraction amounted to an 8% conversion and was a brown, viscous liquid having an RSV of 0.07 in 0.1% solution in water at 25° C. A nitrogen analysis showed that this copolymer of ethylene oxide and 1,1-diethylamino-2,3-epoxy propane contained 28% of the amine monomer.

EXAMPLE 44

Ten parts of butadiene monoxide were polymerized by the same procedure as described in Examples 1–8 for epichlorohydrin. In this case the catalyst used was 0.46 part of triethylaluminum that had been reacted with 1 mole of acetylacetone per mole of aluminum for 20 hours at 30° C. and the diethylaluminum acetylacetonate so formed then reacted with 0.5 mole of water per mole of aluminum for 20 hours at 30° C. After 20 hours at 30° C. the polymerization was stopped by adding 4 parts of anhydrous ethanol, and the ether-insoluble polymer was isolated and purified as described in those examples. The ether-soluble polymer was isolated from the ether filtrate and washes by precipitation with methanol. The data with respect to each of these polymers are tabulated below with the physical data on films prepared from each by compression molding for 5 minutes at 200° F. and 300 p.s.i.

|  | Ether-Insoluble | Ether-Soluble Methanol-Insoluble |
|---|---|---|
| Percent Conversion | 5.7 | 18 |
| RSV (0.1% in CHCl₃ at 25° C.) | >18 | 14.1 |
| X-ray Crystallinity | High | Low |
| M. Pt., °C | 68 | 61 |
| Film Properties: |  |  |
| Tensile strength, p.s.i | 2,300 | 600 |
| Ultimate elongation | 68 | 290 |
| Tensile modulus, p.s.i | 66,000 | 870 |

An infrared spectrum on the ether-insoluble fraction showed that polymerization took place through the oxide ring. The ether-soluble, methanol-insoluble fraction was of low crystallinity but had the same infrared spectrum as the ether-insoluble fraction.

The ether-soluble, methanol-insoluble fraction was vulcanized by compounding on a two-roll mill 100 parts of polymer, 50 parts of high abrasion furnace black, 2 parts of sulfur and 1.5 parts of mercaptobenzothiazole and then curing at 300° F. for 45 minutes. The vulcanizate so obtained had a tensile strength of 1695 p.s.i., ultimate elongation of 245%, 100% and 200%, modulus of 750 and 1250 p.s.i., respectively, and a Shore hardness (A) of 73.

The ether-soluble, methanol-insoluble fraction, which was also insoluble in n-heptane, was further fractionated by ether and found, after isolation, to be 68% insoluble in ether. The latter ether-insoluble fraction was a tough, snappy rubber which was soluble in chloroform and had an RSV of 16.8. It had the same X-ray pattern as the first isolated ether-insoluble product but was only moderately high in crystallinity by X-ray. The ether-soluble fraction from this second fractionation was a snappy rubber having an RSV of 11.0 in chloroform and was of low crystallinity.

EXAMPLES 45–53

In these examples various alkylene oxides were polymerized using the general procedure described in Examples 1–8, using a mixture of ether and n-heptane or all n-heptane as diluent. The alkylaluminum compound that was prereacted with water before using as the catalyst in Examples 46 and 52 was then chelate obtained by reacting triethylaluminum with an equimolar amount of acetylacetone and in Examples 47–51 and 53 was that obtained by reacting triethylaluminum or triisobutylaluminum with the indicated fraction of a mole of chelating agent per mole of aluminum prior to the reaction with the indicated mole ratio of water. The monomer (10 parts in each case) polymerized, diluent, catalyst and amount thereof expressed as parts of the alkylaluminum compound that was reacted with water in the indicated mole ratio, and reaction conditions (time and temperature) are tabulated in Table V along with the percent of isolated polymer and RSV of each polymer as determined on an 0.1% solution in chloroform at 25° C. for poly(ethylene oxide) and an 0.1% solution in benzene at 25° C. for poly(propylene oxide).

The ether-insoluble poly(ethylene oxide) produced in Examples 45–51 was isolated by adding excess ether to the reaction mixture, filtering and then washing with ether, then with 0.5% hydrogen chloride in an 80:20 mixture of ether:methanol, with ether:methanol alone and then with ether containing 0.5% Santonox. The polymer so obtained was a hard, very tough, white solid, M. Pt. 66° C., which formed a very viscous 1% solution in water. In Examples 45 and 49 there was also isolated 8% and 5%, respectively, of an ether-soluble, methanol-insoluble poly(ethylene oxide) that was a waxy, flaky solid.

The poly(propylene oxide) produced in Examples 52 and 53 was ether-soluble and was isolated by adding sufficient ether to make the solution of low viscosity for ease in handling, then washing the reaction mixture first with a 3% aqueous solution of hydrogen chloride, then with water until neutral, then with a 2% aqueous solution of sodium bicarbonate and again with water. After adding Santonox equal to 0.5% based on the polymer to the reaction mixture, the ether was evaporated and the polymer was dried. In each case it was a snappy rubber. The product of Example 52 was further separated into a crystalline and amorphous fraction by dissolving the polymer in acetone at 65° C. at 1% concentration and allowing it to crystallize for 16 hours at −18° C. The crystalline polymer was collected, washed with acetone, then with acetone containing 0.05% Santonox, and dried. This crystalline fraction had an RSV of 10.2. The amorphous fraction, which was still a snappy rubber, had an RSV of 5.7.

*Table V*

| Ex. No. | Diluent Total Parts | Diluent Components | Monomer | Catalyst | Parts | Reaction Conditions | Isolated Polymer Percent Conv. | Isolated Polymer RSV |
|---|---|---|---|---|---|---|---|---|
| 45 | 17.6 | 84% ether, 16% n-heptane | EO | (i-C₄H₉)₃Al·0.5H₂O | 0.79 | 19 Hrs., 30° C | 32 | 1.05 |
| 46 | 17.6 | do | EO | (C₂H₅)₂AlAcetylacetonate·0.5H₂O | 0.74 | 19 Hrs., 30° C | 95 | 16.8 |
| 47 | 35 | 100% n-heptane | EO | (i-C₄H₉)₃Al·0.5Hydroxyacetone·0.5H₂O | 0.79 | 19 Hrs., 40° C | 37 | 7.7 |
| 48 | 28.8 | do | EO | (C₂H₅)₃Al·0.5 (2,3-butane dione-2-oxime)·0.5H₂O | 0.46 | 19 Hrs., 30° C | 97 | 37 |
| 49 | 28.8 | do | EO | (C₂H₅)₃Al·0.25 oxalic acid·0.5H₂O | 0.46 | 19 Hrs., 30° C | 22 | 3.0 |
| 50 | 28.8 | do | EO | (i-C₄H₉)₃Al·0.5 diethyl malonate·0.5H₂O | 0.79 | 19 Hrs., 30° C | 50 | 5.3 |
| 51 | 28.8 | do | EO | (i-C₄H₉)₃Al·0.5 dimethyl glyoxime·0.5H₂O | 0.79 | 19 Hrs., 30° C | 89 | 18.3 |
| 52 | 17.6 | 84% ether, 16% n-heptane | PO | (C₂H₅)₂AlAcetylacetone·0.5H₂O | 0.74 | 19 Hrs., 30° C | 69 | 16.1 |
| 53 | 35 | 100% n-heptane | PO | (i-C₄H₉)₃Al·0.5Acetylacetone·0.5H₂O | 0.79 | 48 Hrs., 30° C | 87 | 9.5 |

EO = ethylene oxide; PO = propylene oxide.

EXAMPLES 54–74

In these examples various epoxides were copolymerized using the general procedure described in Examples 1–8. In each case the alkylaluminum compound was prereacted with the specified mole ratio of water as described in those examples. In Examples 65, 69 and 71 the catalyst solution was added in 2 equal portions 0.5 hour apart and in Example 60 the catalyst solution was added in 4 equal portions 0.5 hour apart.

In Table VI are set forth the monomers copolymerized and the amount of each, the diluent used and amount thereof, the catalyst and amount thereof expressed as parts of the alkylaluminum compound that was reacted with water or chelated with acetylacetone (A) and reacted with water in the indicated mole ratio, the reaction time and temperature and the percent conv. to isolated polymer obtained and the RSV of each polymer determined on an 0.1% solution in (1) chloroform at 25° C., (2) α-chloronaphthalene at 100° C., and (3) in benzene at 25° C. The monomers copolymerized are indicated by the following abbreviations:

EO=ethylene oxide
ECH=epichlorohydrin
EBH=epibromohydrin
PO=propylene oxide
BMO=butadiene monoxide
VCMO=vinylcyclohexene monoxide (1,2-epoxy-4-vinyl-cyclohexane)
AGE=allyl glycidyl ether
CEGE=2-chloroethyl glycidyl ether
BCEO=1,1-bis(chloromethyl)ethylene oxide
MCO=methallyl chloride epoxide
ECD=1,2-epoxy-5,9-cyclododecadiene The copolymers obtained in Examples 54–56, 62, 63, 65 and 73 were isolated by adding 1–5 volumes of n-heptane to precipitate the polymer, filtering, and then washing with n-heptane and a 0.2% solution of Santonox in n-heptane and finally drying for 16 hours at 80° C. in vacuo.

The copolymers obtained in Examples 57 and 66–71 were isolated in the same manner as described for Examples 52–53. A similar procedure was used for isolating the propylene oxide-1,2-epoxy-5,9-cyclododecadiene copolymer of Example 72 except that the polymer was washed 3 times with 10% sodium hydroxide and then with water until neutral instead of with acid, etc.

The epichlorohydrin-ethylene oxide-allyl glycidyl ether of Example 61 was isolated by adding 1–2 volumes of 1% methanolic hydrogen chloride to precipitate the polymer, filtering, washing the polymer first with methanol and then with an 0.2% solution of Santonox in methanol and drying.

The ethylene oxide-propylene oxide copolymer produced in Example 64 was isolated by adding sufficient acetone containing 2% water to give a handable but still viscous solution (conc. about 1%) and after centrifuging to remove any insolubles, removing the diluents and drying the polymer to constant weight. It was a rubbery, amorphous polymer soluble in ether and water, but was insoluble in n-heptane. Infrared analysis indicated that the copolymer contained 41% propylene oxide.

The ethylene oxide-propylene oxide-butadiene monoxide terpolymer produced in Example 74 was isolated as described for the isolation of the polymer in Example 64. It had the same solubility characteristics as the ethylene oxide-propylene oxide copolymer of Example 64 and represents a unique water-soluble sulfur vulcanizable elastomer. Infrared analysis indicated that the polymer contained about 46% ethylene oxide, 42% propylene oxide and 12% butadiene monoxide.

The copolymers produced in these examples were all largely amorphous, a number of them being completely amorphous as shown by X-ray diffraction.

Table VI

| Ex. No. | Diluent | | Monomer | Parts | Catalyst | Parts | Reaction Conditions | Isolated Polymer | |
|---|---|---|---|---|---|---|---|---|---|
| | Total Parts | Components | | | | | | Percent Conv. | RSV |
| 54 | 40 | Toluene | ECH<br>EO | 5.1<br>4.9 | $(C_2H_5)_3Al \cdot 0.5A \cdot 0.5H_2O$ | 0.23 | 6 Hrs., 30° C | 22 | 11.4 (1) |
| 55 | 40 | do | ECH<br>EO | 9.0<br>1.0 | $(C_2H_5)_3Al \cdot 0.5A \cdot 0.5H_2O$ | 0.23 | 27 Hrs., 30° C | 19 | 9.2 (2) |
| 56 | 40 | do | ECH<br>PO | 9.0<br>1.0 | $(C_2H_5)_3Al \cdot 0.5A \cdot 0.5H_2O$ | 0.23 | 30 Hrs., 30° C | 21 | 9.6 (2) |
| 57 | 31 | n-Heptane | ECH<br>PO | 2.0<br>8.0 | $(C_2H_5)_3Al \cdot 0.5A \cdot 0.5H_2O$ | 0.23 | 19 Hrs., 30° C | 28 | 14.5 (3) |
| 58 | 20 | do | ECH<br>BMO | 9.9<br>0.6 | $(C_2H_5)_2AlA \cdot 0.5H_2O$ | 0.45 | 4 Hrs., 50° C | 7 | 6.7 (2) |
| 59 | 20 | do | ECH<br>VCMO | 9.9<br>0.6 | $(C_2H_5)_2AlA \cdot 0.5H_2O$ | 0.45 | 4 Hrs., 50° C | 6.5 | >1.1 (2) |
| 60 | 44 | Ether | ECH<br>EBH | 18<br>2 | $(i-C_4H_9)_3Al \cdot 0.5H_2O$ | 1.58 | 5.5 Hrs., 30° C | 74 | 2.1 (2) |
| 61 | 40 | Toluene | ECH<br>EO<br>AGE | 8<br>1<br>1 | $(C_2H_5)_3Al \cdot 0.5A \cdot 0.5H_2O$ | 0.23 | 27 Hrs., 30° C | 12 | 5.4 (2) |
| 62 | 40 | do | ECH<br>PO<br>AGE | 4.5<br>4.5<br>1 | $(C_2H_5)_3Al \cdot 0.5A \cdot 0.5H_2O$ | 0.23 | 27 Hrs., 30° C | 9 | >11.2 (3) |
| 63 | 39 | do | ECH<br>EO<br>PO<br>AGE | 2.9<br>5.1<br>1.0<br>1.0 | $(C_2H_5)_3Al \cdot 0.5A \cdot 0.5H_2O$ | 0.23 | 4 Hrs., 30° C | 16 | 11.7 (1) |
| 64 | 17.6 | 84% ether, 16% n-heptane | EO<br>PO | 5<br>5 | $(C_2H_5)_2AlA \cdot 0.5H_2O$ | 0.74 | 6 Hrs., 30° C | 22 | 11.9 (1) |
| 65 | 28.6 | n-Heptane | EO<br>CEGE | 8<br>2 | $(C_2H_5)_2AlA \cdot 0.5H_2O$ | 0.46 | 5 Hrs., 30° C | 18 | 14.6 (1) |
| 66 | 17.6 | 84% ether, 16% n-Heptane | PO<br>BMO | 9<br>1 | $(C_2H_5)_2AlA \cdot 0.5H_2O$ | 0.74 | 8 Hrs., 30°C | 22 | 9.8 (3) |
| 67 | 66 | n-Heptane | PO<br>AGE | 9<br>1 | $(C_2H_5)_3Al \cdot 0.5A \cdot 0.5H_2O$ | 0.23 | 7 Hrs., 50° C | 21 | 15.8 (3) |
| 68 | 17.6 | 20% ether, 80% n-Heptane | PO<br>VCMO | 9.4<br>0.6 | $(C_2H_5)_2AlA \cdot 0.5H_2O$ | 0.74 | 4 Hrs., 30° C | 11 | 12.5 (3) |
| 69 | 31.4 | n-Heptane | PO<br>CEGE | 8<br>2 | $(C_2H_5)_3Al \cdot 0.5A \cdot 0.5H_2O$ | 0.46 | 7.5 Hrs., 30° C | 41 | 9.2 (3) |
| 70 | 28.7 | do | PO<br>BCEO | 8<br>2 | $(C_2H_5)_3Al \cdot 0.5A \cdot 0.5H_2O$ | 0.45 | 5 Hrs., 30° C | 27 | 6.7 (3) |
| 71 | 40 | Toluene | PO<br>MCO | 5<br>5 | $(C_2H_5)_3Al \cdot 0.5A \cdot 0.5H_2O$ | 0.45 | 6 Hrs., 30° C | 13 | 12.7 (3) |
| 72 | 29 | n-Heptane | PO<br>ECD | 8<br>2 | $(C_2H_5)_2AlA \cdot 0.5H_2O$ | 0.45 | 4 Hrs., 30° C | 16 | 7.8 (3) |
| 73 | 40 | Toluene | PO<br>EO<br>AGE | 7.5<br>1.5<br>1.0 | $(C_2H_5)_3Al \cdot 0.5A \cdot 0.5H_2O$ | 0.23 | 22 Hrs., 30° C | 19 | >8.7 (3) |
| 74 | 17.6 | 84% ether, 16% n-Heptane | PO<br>EO<br>BMO | 4.5<br>4.5<br>1 | $(C_2H_5)_2AlA \cdot 0.5H_2O$ | 0.74 | 6 Hrs., 30° C | 31 | 23.0 (1) |

See explanation of abbreviations and notes under Examples 54–74, col. 17.

The copolymers produced in Examples 58–60 were isolated by diluting the reaction mixture with ether, collecting the ether-insoluble polymer, slurrying it with a 1% solution of hydrogen chloride in ethanol, again collecting it and washing with methanol until neutral and finally with an 0.4% solution of Santonox in methanol, after which it was dried.

A description of the copolymers produced in Examples 54–74 is summarized in Table VII along with the physical data on vulcanizates prepared from a number of them. The vulcanization was done by compounding on a two-roll mill (roll temperature of 175° F.) for 5–7 minutes, 100 parts of the polymer with the specified vulcanization formula and then press curing at 310° F. for 40 minutes.

The vulcanization formulas used (based on 100 parts of polymer) were

| Formula No. | I | II | III |
|---|---|---|---|
| Fast extruding furnace black | 30 | 30 | |
| Sulfur | 2 | | 5 |
| Zinc Oxide | 3 | | 5 |
| Stearic Acid | 2 | | 2 |
| Triethylenediamine | | 4 | |
| Tetramethylthiuram disulfide | | | 2.5 |
| Mercaptobenzothiazole | 1.5 | | |

The copolymers of Examples 66 and 74 were vulcanized by a formula like that of I but using 50 parts of black instead of 30 (designated as I*a*) and the copolymer of Example 68 was vulcanized by the Formula I except that no black was used (designated as I*b*). The triethylenediamine used above was 1,4-diazobicyclo(2.2.2)octane.

Typical of the advantages to be found in many of these copolymers is the vulcanizate of the propylene oxide–allyl glycidyl ether (Example 67) which in addition to the excellent properties shown in Table VII, is also found to be superior to natural and GR–S rubbers in its hysteresis properties (lower heat build-up on flexing) and in its low temperature properties.

ether several times. In Example 75 a 57% conversion to a powdery solid which was insoluble in α-chloronaphthalene at the boiling point was obtained. In Example 76 there was obtained a 41% conversion to a tough, rubbery copolymer which was also insoluble in α-chloronaphthalene at the boiling point.

As may be seen from the foregoing examples, the process of this invention makes it possible to produce a wide variety of polymeric epoxides and obtain higher conversions or other improved results. Thus, in some cases it is possible to produce extremely high molecular weight polymers and copolymers, which in most cases have not heretofore been available and these higher molecular weight polymers have much greater utility than the prior art polymers. In other cases it has been possible to produce crystalline polymers from monomers that have previously been polymerized only to viscous oils or to low molecular weight amorphous materials.

The polymeric epoxides produced in accordance with this invention may be used for a wide variety of applications. Many of these polymers are rubber-like in nature and hence may be used as lube oil additives, wax additives, caulking compounds, adhesive components, etc., and when vulcanized as compositions for gaskets, hoses and rubber compositions in general. Others are crystalline

*Table VII*

| Ex. No. | Copolymer Composition, Percent by Weight | Description | Water Solubility | Acetone Solubility, Percent | Vulcanization Formula | Tensile Strength, p.s.i. | Modulus 300%, p.s.i. | Ultimate Elongation, Percent | Shore Hardness A2 | Percent Gel Formation | Percent Swell (Toluene) |
|---|---|---|---|---|---|---|---|---|---|---|---|
| 54 | ECH:EO, 14:86 | Hard, tough rubber. | 74% | 100 | II | | | | | 93 | 740 |
| 55 | ECH:EO, 60:40 | Snappy rubber | Insol | 83 | II | 1,325 | 1,140 | 330 | 50 | 100 | 180 |
| 56 | ECH:PO, 77:23 | Tough rubber | Insol | 85 | | | | | | | |
| 57 | ECH:PO, 16:84 | ---do--- | Insol | | II | 310 | 160 | 650 | 37 | | |
| 58 | ECH:BMO, 95:5 | ---do--- | Insol | | III | | | | | 99 | 185 |
| 59 | ECH:VCMO | ---do--- | Insol | | III | | | | | 72 | 600 |
| 60 | ECH:EBH, 91:9 | ---do--- | Insol | | II | 970 | | 85 | | 100 | 95 |
| 61 | ECH:EO:AGE, 59:34:7 | Snappy rubber | Insol | 100 | I | 1,710 | | 250 | 64 | 100 | 125 |
| 62 | ECH:PO:AGE, 43:48:9 | ---do--- | Insol | 70 | I | 2,710 | 1,140 | 530 | 59 | 99 | 280 |
| 63 | ECH:EO:PO:AGE, 8:76:18:10 | Tough rubber | 86% | 100 | I | 3,090 | 1,800 | 540 | 78 | 98 | 230 |
| 64 | EO:PO, 59:41 | Rubber | Sol | | | | | | | | |
| 65 | EO:CEGE, 93:7 | Tough rubber | Largely Sol. | | | | | | | | |
| 66 | PO:BMO, 80:20 | Snappy rubber | Insol | | I*a* | 1,690 | 1,340 | 410 | 81 | | |
| 67 | PO:AGE, 92:8 | Tough, snappy rubber. | Insol | | I | 2,190 | 820 | 625 | 55 | 97 | 405 |
| 68 | PO:VCMO, 99:1 | ---do--- | Insol | | I*b* | | | | | 86 | 1,920 |
| 69 | PO:CEGE, 78:22 | Tough rubber | Insol | | II | 1,130 | 1,080 | 310 | 56 | 94 | 295 |
| 70 | PO:BCEO, 99.3:0.7 | Snappy rubber | Insol | | | | | | | | |
| 71 | PO:MCO, 99:1 | Rubber | Insol | | | | | | | | |
| 72 | PO:ECD, 91:9 | Snappy rubber | Insol | | | | | | | | |
| 73 | PO:EO:AGE, 64:28:8 | | 33% | 66 | I | 1,250 | 605 | 490 | 60 | 97 | 395 |
| 74 | PO:EO:BMO, 42:46:12 | | Sol | | I*a* | 1,515 | 1,310 | 400 | 81 | | |

See explanation of abbreviations under Examples 54–74, col. 17.

EXAMPLES 75 AND 76

The diglycidyl ether of bisphenol A, i.e. 2,2-(4-hydroxyphenyl)propane, was homopolymerized and copolymerized with butene-1 epoxide following the same general procedure used in the foregoing examples, except that no diluent, other than that present in the catalyst solution was used. In Example 75 the polymerization vessel was charged with 10 parts of the diglycidyl ether of bisphenol A and the catalyst added was 0.79 part of triisobutylaluminum which had been reacted with 0.5 mole of water per mole of aluminum. In Example 76 the polymerization vessel was charged with 5 parts of the diglycidyl ether of bisphenol A and 5 parts of butene-1 epoxide and the catalyst added was 0.46 part of triethylaluminum reacted with 0.5 mole of acetylacetone per mole of aluminum and the chelate then reacted with 0.5 mole of water per mole of aluminum. After 21 hours at 30° C. the polymers were isolated by washing the reaction mixture, which was a solid white mass in each case, with and are useful as plastics, as film-formers, in coatings, for fibers, etc.

What I claim and desire to protect by Letters Patent is:

1. As a new composition of matter, a polymerization catalyst consisting of the organoaluminum oxide formed by reacting an organoaluminum compound free of ethylenic unsaturation with water in an amount such that the molar ratio of water to organoaluminum compound is within the range of from about 0.1 to about 1.5 and such that said organoaluminum oxide retains at least some of the aluminum-to-carbon bonds present in the organoaluminum compound so reacted.

2. The composition of claim 1 wherein the organoaluminum compound reacted is selected from the group consisting of trialkylaluminum, dialkylaluminum hydride and alkylaluminum halides.

3. As a new composition of matter, a polymerization catalyst consisting of the organoaluminum oxide formed by reacting a trialkylaluminum with water in an amount such that (1) the molar ratio of water to the trialkylaluminum is within the range of from about 0.1 to about 1.5 and (2) there remains in the reaction product at least about one aluminum-to-carbon bond per mole of aluminum.

4. As a new composition of matter, a polymerization catalyst consisting of the organoaluminum oxide formed by reacting a dialkylaluminum hydride with water in an amount such that (1) the molar ratio of water to the dialkylaluminum hydride is within the range of from about 0.1 to about 1.5 and (2) there remains in the reaction product at least about one aluminum-to-carbon bond per mole of aluminum.

5. As a new composition of matter, a polymerization catalyst comprising the organoaluminum oxide formed by reacting an organoaluminum compound free of ethylenic unsaturation with from about 0.01 to about 1.5 moles of a chelating agent per mole of aluminum compound, and with from about 0.1 to about 1.5 moles of water per aluminum compound, the total amount of said chelating agent and water reacted with said organoaluminum compound being such that said organoaluminum oxide retains at least some of the aluminum-to-carbon bonds present in the organoaluminum compound so reacted, said chelating agent being an organic compound having two functional groups, one of which is selected from the group consisting of —OH and —SH, and the other is a group containing an element selected from the group consisting of O, N, and S, which forms a co-ordinate bond with aluminum.

6. The product of claim 5 wherein the organoaluminum compound is a trialkylaluminum.

7. The product of claim 6 wherein the chelating agent is acetylacetone.

8. The product of claim 2 wherein the molar ratio of water to organoaluminum compound is within the range of from about 0.2 to about 1.

9. As a new composition of matter, a polymerization catalyst comprising the organoaluminum oxide formed by reacting a trialkylaluminum with about 0.5 mole of acetylacetone per mole of aluminum and with about 0.5 mole of water per mole of aluminum.

10. As a new composition of matter, a polymerization catalyst comprising the organoaluminum oxide formed by reacting a trialkylaluminum in the presence of an ether with about 0.5 mole of acetylacetone per mole of aluminum and with about 0.5 mole of water per mole of aluminum.

References Cited by the Examiner

UNITED STATES PATENTS

| | | | |
|---|---|---|---|
| 2,699,457 | 1/1955 | Ziegler et al. | 260—448 |
| 2,801,228 | 7/1957 | Schlenker et al. | 260—2 |
| 2,866,761 | 12/1958 | Hill et al. | 260—2 |
| 2,870,100 | 1/1959 | Stewart et al. | 260—47 |
| 2,984,658 | 5/1961 | Seydel et al. | 260—94.9 |

OTHER REFERENCES

Ziegler: Uspekhi Khimii, Vol. 26, 1957, pp. 1187–1200 (page 1198 relied on).

Calcough et al.: J. Polymer Science, Vol. 34, page 179, January 1959.

TOBIAS E. LEVOW, *Primary Examiner.*